United States Patent
Nakajima et al.

(10) Patent No.: US 7,184,860 B2
(45) Date of Patent: Feb. 27, 2007

(54) IN-STORE EQUIPMENT REMOTE MONITORING SYSTEM

(75) Inventors: Hideki Nakajima, Daito (JP); Tsuyoshi Kawaai, Uji (JP)

(73) Assignee: Sanyo Electric Co., Ltd., Osaka (JP)

( * ) Notice: Subject to any disclaimer, the term of this patent is extended or adjusted under 35 U.S.C. 154(b) by 477 days.

(21) Appl. No.: 10/764,466

(22) Filed: Jan. 27, 2004

(65) Prior Publication Data

US 2004/0186628 A1    Sep. 23, 2004

Related U.S. Application Data

(63) Continuation of application No. 10/103,563, filed on Mar. 22, 2002, now abandoned.

(30) Foreign Application Priority Data

Mar. 30, 2001    (JP)    ............... 2001-99485

(51) Int. Cl.
G05D 11/00    (2006.01)
G05D 17/00    (2006.01)

(52) U.S. Cl. ............. 700/291; 700/143; 702/182

(58) Field of Classification Search ............... 702/182; 700/291, 108, 143
See application file for complete search history.

(56) References Cited

U.S. PATENT DOCUMENTS

| | | | |
|---|---|---|---|
| 4,847,781 A | 7/1989 | Brown et al. | |
| 5,539,633 A | 7/1996 | Hildebrand et al. | |
| 5,566,084 A | 10/1996 | Cmar | |
| 5,761,083 A * | 6/1998 | Brown et al. | ............... 700/296 |
| 5,777,895 A | 7/1998 | Kuroda et al. | |
| 5,924,486 A * | 7/1999 | Ehlers et al. | ............... 165/238 |
| 6,454,177 B1 * | 9/2002 | Sasao et al. | ............... 236/46 R |
| 6,478,233 B1 | 11/2002 | Shah | |
| 6,577,962 B1 * | 6/2003 | Afshari | ............... 702/61 |
| 2001/0048376 A1 | 12/2001 | Maeda et al. | |
| 2002/0124992 A1 * | 9/2002 | Rainer et al. | ............... 165/11.1 |

FOREIGN PATENT DOCUMENTS

JP    2000-245595    9/2000

* cited by examiner

*Primary Examiner*—Kidest Bahta
*Assistant Examiner*—Nate Laughlin
(74) *Attorney, Agent, or Firm*—Smith, Gambrell & Russell, LLP

(57) ABSTRACT

A monitoring system is provided for remotely monitoring in-store equipment. A controller is provided in each store for monitoring and controlling in-store equipment. A monitoring computer is connected to the controller in each store through a communication line. The controller includes data transmission means for transmitting to the monitoring computer data related to each in-store equipment and predetermined measurement data, and display means for displaying power saving advice information fed from the monitoring computer, and the monitoring computer comprising power saving advice information production means for producing power saving advice information for efficiently operating each in-store equipment on the basis of the data received from the controller, and power saving advice information transmission means for transmitting to the controller the produced power saving advice information.

2 Claims, 8 Drawing Sheets

| DATE | TIME | PROBABILITY OF PRECIPITATION | OUTSIDE - STORE ILLUMINATION |
|------|------|------------------------------|------------------------------|
|      |      |                              |                              |
|      |      |                              |                              |

CURRENTLY SET ILLUMINATION IS 60,000 LUX.
SET ILLUMINATION LEVEL IS 3.
IF YOU SET ILLUMINATION LEVEL TO 2,
 YOU WILL MAKE SAVING OF 100 YEN PER DAY.
IF YOU ADJUST ILLUMINATION ACCORDING TO FOLLOWING SCHEDULE,
 YOU WILL MAKE SAVING OF 300 YEN PER DAY.
  FROM 8 TO 12   ILLUMINATION LEVEL 2
  FROM 12 TO 16  ILLUMINATION LEVEL 1
  FROM 16 TO 20  ILLUMINATION LEVEL 2

FIG. 8

| DATE | TIME t | INSIDE-STORE TEMPERATURE | OUTSIDE-STORE TEMPERATURE | INTERIOR TEMPERATURE OF SHOWCASE | NUMBER OF TIMES OF DOOR OPENING / CLOSING | WEATHER |
|---|---|---|---|---|---|---|
| 1/1 | 8:00 | 20 | 23 | 7 | 3 | FINE |
| | 8:10 | 21 | 24 | 6 | 2 | |
| | 8:20 | 20 | 24 | 7 | 2 | |
| ⋮ | ⋮ | ⋮ | ⋮ | ⋮ | ⋮ | ⋮ |

FIG. 9

| | TIME t | INSIDE-STORE TEMPERATURE | OUTSIDE-STORE TEMPERATURE | INTERIOR TEMPERATURE OF SHOWCASE | NUMBER OF TIMES OF DOOR OPENING / CLOSING |
|---|---|---|---|---|---|
| TOMORROW FINE | 8:00 | 20 | 15 | 2 | 3 |
| | ⋮ | ⋮ | ⋮ | ⋮ | ⋮ |
| | 20:00 | | | | |

IN-STORE EQUIPMENT REMOTE MONITORING SYSTEM

The present application is a continuation of Ser. No. 10/103,563, filed Mar. 22, 2002, now abandoned which prior application is incorporated herein by reference.

BACKGROUND

1. Field of the Invention

The inventions relate to in-store equipment for remote monitoring.

2. Description of the Prior Art

There are systems for monitoring the interior temperature of freezing equipment by using a remote monitoring device. The remote monitoring device changes the set value of the interior temperature of the freezing equipment depending on how the monitored interior temperature has changed (see JP-A-2000-245595). However, an in-store equipment remote monitoring system for achieving power saving has not yet been developed.

SUMMARY

The inventions provide in-store equipment remote monitoring system capable of efficiently operating in-store equipment.

The inventions are directed to an in-store equipment monitoring system comprising a controller provided in each store and monitoring and controlling in-store equipment and a monitoring computer connected to the controller in the store through a public line. The controller comprises data transmission means for transmitting to the monitoring computer data related to in-store equipment and predetermined measurement data, and display means for displaying power saving advice information fed from the monitoring computer. The monitoring computer comprises power saving advice information production means for producing power saving advice information for efficiently operating each in-store equipment on the basis of the data received from the controller, and power saving advice information transmission means for transmitting to the controller the produced power saving advice information.

When the in-store equipment is illuminating equipment, an example of the data transmission means is one for transmitting inside-store illumination set by a user and an outside-store illumination measured value from the controller to the monitoring computer. Further, an example of the power saving advice information production means is one comprising means for calculating, on the basis of historical data related to the outside-store illumination measured values received from the controller, historical data related to weather, and weather forecasting for tomorrow, an outside-store illumination estimated values for times during tomorrow, and means for calculating, on the basis of the obtained outside-store illumination estimated values for times during tomorrow and the set inside-store illumination received from the controller, recommended inside-store illumination for times during tomorrow.

When the in-store equipment is air conditioning equipment, an example of the data transmission means is one for transmitting an inside-store temperature set by a user, an inside-store temperature measured value and an outside-store temperature measured value, and the measured value of a factor affecting the inside-store temperature by equipment other than the air conditioning equipment from the controller to the monitoring computer. An example of the power saving advice information production means is one comprising means for calculating, on the basis of historical data related to the inside-store temperature measured values, the outside-store temperature measured values, and the measured values of the factors affecting the inside-store temperature by the equipment other than the air conditioning equipment which are received from the controller, historical data related to weather forecasting, and weather forecasting for tomorrow, an inside-store temperature estimated value for times during tomorrow, and means for calculating, on the basis of the obtained inside-store temperature estimated values for times during tomorrow and the set inside-store temperature received from the controller, an inside-store temperature adjustment levels for times during tomorrow.

An example of the measured value of the factor affecting the inside-store temperature by the equipment other than the air conditioning equipment is the measured value of the interior temperature of a freezing equipment and/or the number of times of opening/closing of a store outlet/inlet door.

The foregoing features, aspects and advantages of the inventions will become more apparent from the following detailed description of the inventions when taken in conjunction with the accompanying drawings.

BRIEF DESCRIPTION OF THE DRAWINGS

FIG. 6 is a schematic view showing an example of display of data received from a monitoring PC 20;

FIG. 8 is a schematic view showing a database for temperature estimation;

FIG. 9 is a schematic view showing data calculated in the process of calculating an inside-store temperature estimated value;

DETAILED DESCRIPTION

Figure 1:
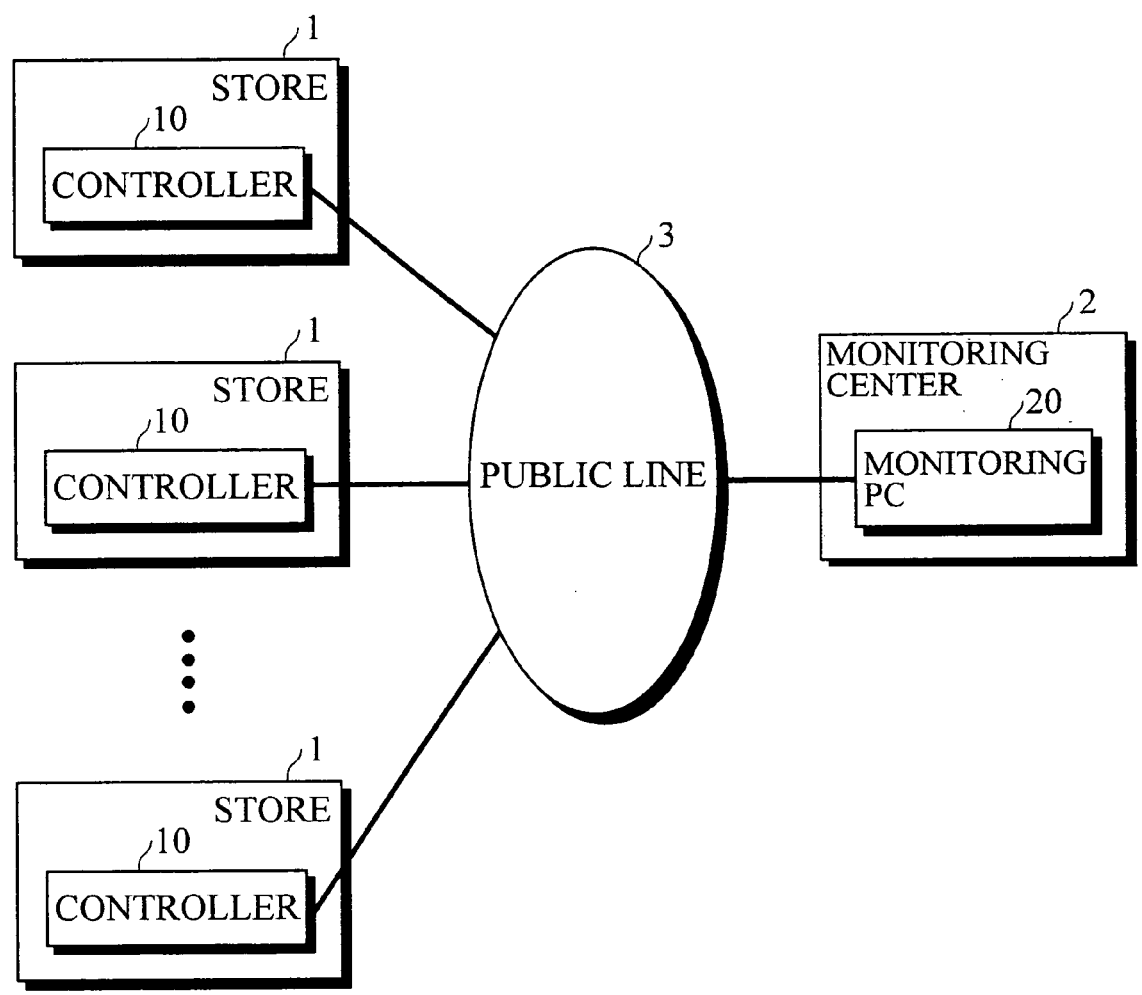
FIG. 1 is a block diagram showing the configuration of an in-store monitoring system.

Referring now to the drawings, an embodiment of the inventions will be described.

[1] Description of Configuration of In-Store Equipment Monitoring System

FIG. 1 illustrates the configuration of an in-store equipment monitoring system.

The in-store equipment monitoring system comprises stores 1 such as a plurality of convenience stores and a monitoring center 2 for providing power saving advice information to each of the stores 1.

A controller 10 for synthetically monitoring the operating state of equipment in the store 1 and measured values by various types of measuring devices as well as controlling equipment installed in the store 1. A monitoring personal computer (a monitoring PC) 20 is installed in the monitoring center 2.

The controller 10 in each of the stores 1 is networked to equipment in the store 1. Further, the controller 10 in the store 1 is connected to the monitoring PC 20 in the monitoring center 2 through a public line (an analog telephone line, an ISDN (Integrated Services Digital Network), etc.) 3.

[2] Description of Configuration of Equipment in Store

Figure 2:
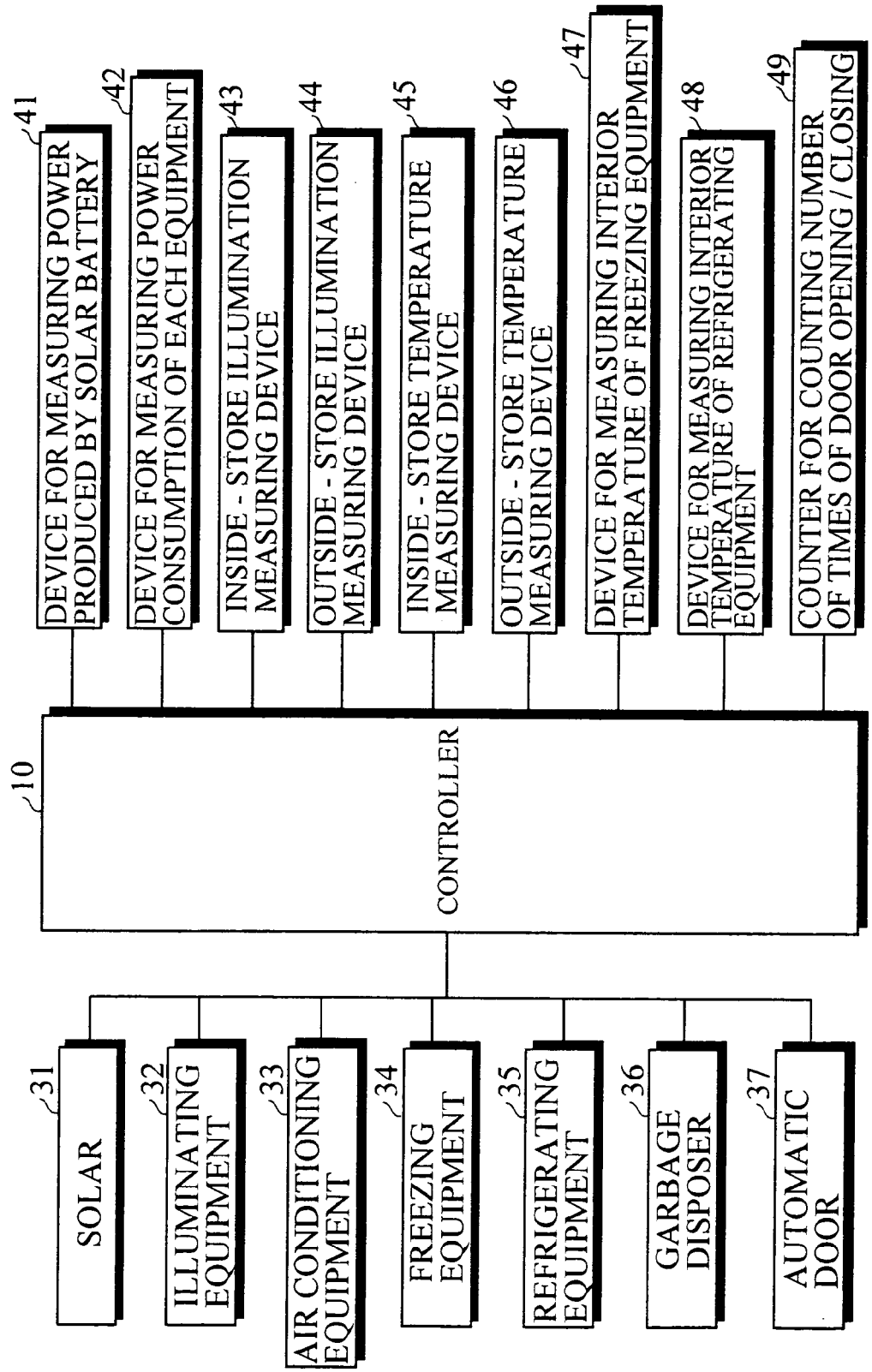
FIG. 2 is a block diagram showing the configuration of equipment in each store.

FIG. 2 illustrates the configuration of equipment in each store.

As equipment in the store, there are provided in this example a solar battery 31, illuminating equipment 32, air conditioning equipment (an air conditioner) 33, freezing equipment (including a freezing showcase, a compressor, etc.) 34, refrigerating equipment (a refrigerator) 35, a garbage disposer 36, and a store outlet/inlet door (an automatic door) 37. The equipment is networked to the controller 10.

As a measuring device, there are provided in this example a device 41 for measuring power produced by the solar battery 31, a device 42 for measuring power consumption of equipment, an inside-store illumination measuring device 43, an outside-store illumination measuring device 44, an interior temperature measuring device 45, an outside-store temperature measuring device 46, a device 47 for measuring the interior temperature of the freezing equipment 34 (a device for measuring the interior temperature of the freezing showcase), a device 48 for measuring the interior temperature of the refrigerating equipment 35, a counter 49 for counting the number of times of opening/closing of the automatic door 37, and so forth. Each of the measuring devices is connected to the controller 10.

[3] Description of Outline of Operations of In-Store Equipment Monitoring System The controller 10 in each of the stores 1 transmits information related to equipment in the store 1 and measured values by various measuring devices to the monitoring PC 20 in the monitoring center 2 through the public line 3. The monitoring PC 20 produces power saving advice information for reducing power consumption for each store on the basis of data sent from the controller 10 in the store 1 and transmits the produced power saving advice information to the corresponding controller 10. The controller 10 in the store 1 displays the power saving advice information sent from the monitoring PC 20 on a monitor of the controller 10. A user operates the controller 10 on the basis of the power saving advice information displayed on the monitor, to control the power consumption of equipment.

A large part of the power of the store depends on the illuminating equipment 32, the air conditioning equipment (air conditioner) 33, the freezing equipment (freezing showcase) 34, and the refrigerating equipment (refrigerator) 35. Accordingly, the monitoring PC 20 produces the following power saving advice information with respect to the equipment, and provides the produced power saving advice information to the controller 10.

(1) Illuminating Equipment 32

The monitoring PC 20 estimates outside-store illumination corresponding to one day on the basis of outside-store illumination and data representing weather forecasting, and provides power saving advice information for efficiently driving the illuminating equipment 32 on the basis of the results of the estimation of the outside-store illumination.

(2) Air Conditioning Equipment (Air Conditioner) 33

Generally, the air conditioning equipment 33 carries out driving control on the basis of only an inside-store temperature and inside-store humidity. The monitoring PC 20 in the monitoring center 2 also provides power saving advice information for efficiently driving the air conditioning equipment 33 in consideration of other factors affecting the inside-store temperature together with the inside-store temperature, an outside-store temperature, and data representing weather forecasting.

Here, the other factors affecting the inside-store temperature include the interior temperature of the freezing equipment (freezing showcase) 34 and the number of times of opening/closing of the automatic door 37 per unit time.

(3) Freezing Equipment 34 or Refrigerating Equipment 35

For example, the monitoring PC 20 provides, with respect to the freezing equipment 34, power saving advice information for efficiently controlling the opening/closing of an electromagnetic valve and an output of a compressor in consideration of the set temperature of the air conditioning equipment 33 and the inside-store temperature.

The monitoring PC 20 only monitors, with respect to the solar battery 31 and the garbage disposer 36, the driving, and receives from the controller 10 a warning in a case where the equipment develops a fault.

[4] Description of Method of Producing Power Saving Advice Information for Illuminating Equipment 32

Figure 3:
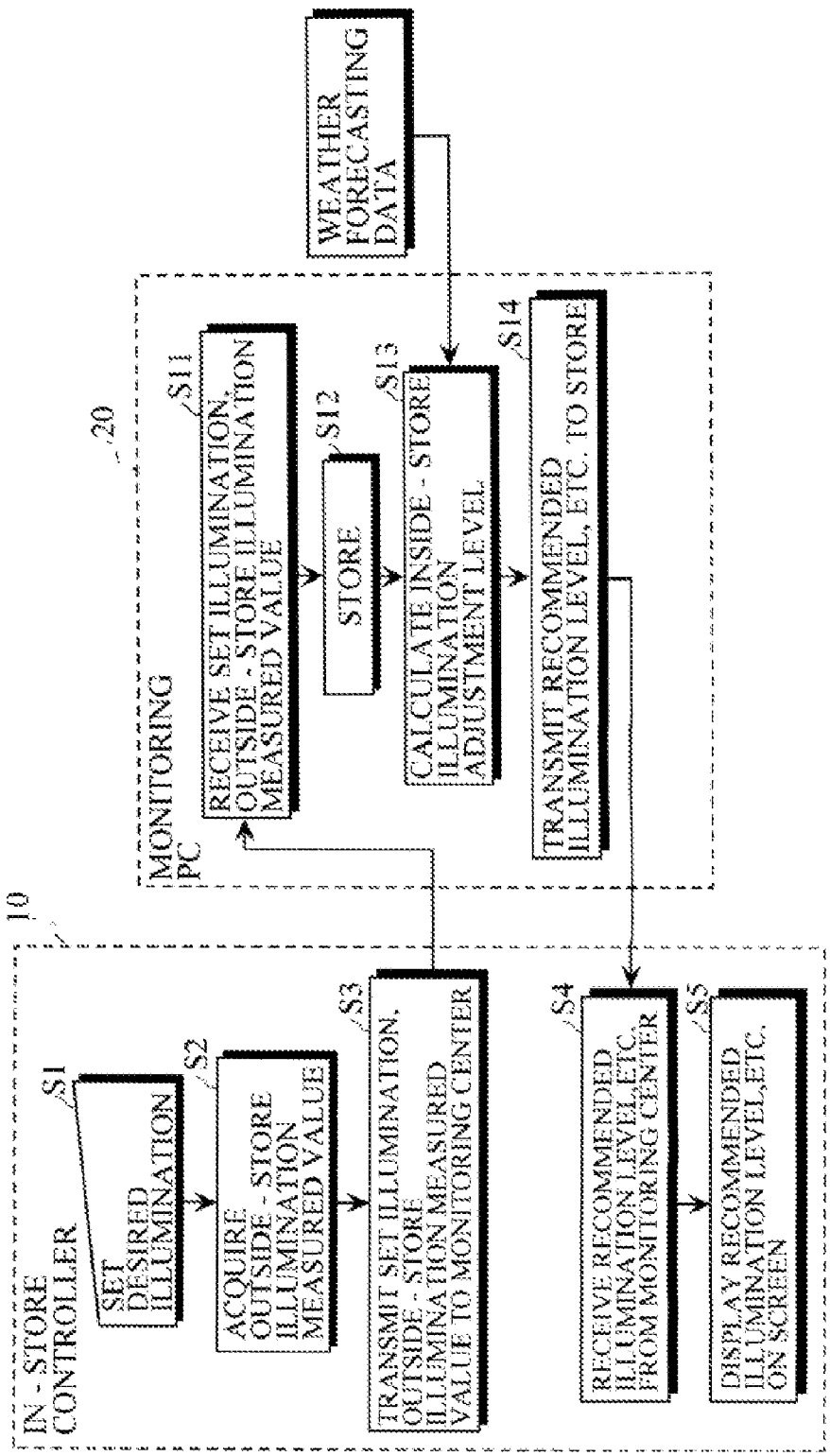
FIG. 3 is a flow chart for explaining a method of producing power saving advice information corresponding to illuminating equipment 32.

Referring to FIG. 3, a method of producing power saving advice information related to the illuminating equipment 32 will be specifically described. Here, description is made of a method of producing power saving advice information related to the illuminating equipment 32 in one predetermined store 1.

In the predetermined store 1, the user sets desired illumination (desired inside-store illumination) for the controller (in-store controller) 10 (step 1). The controller 10 acquires an outside-store illumination measured value from the outside-store illumination measuring device 44 (step 2). The controller 10 transmits the illumination set by the user and the acquired outside-store illumination measured value to the monitoring PC 20 in the monitoring center 2 (step 3). Such processing is performed for each predetermined time period.

When the monitoring PC 20 in the monitoring center 2 receives the set illumination and the outside-store illumination measured value from the controller 10 (step 111), it stores them in a storage device (step 112).

Processing for calculating an inside-store illumination adjustment level corresponding to all tomorrow is performed on the basis of the set illumination and the outside-store illumination measured value which have been so far received and data representing weather forecasting (step 13).

Description is made of the processing for calculating the inside-store illumination adjustment level. The monitoring PC 20 produces a database for illumination estimation storing the date, the time, the probability of precipitation, and outside-store illumination, as shown in FIG. 4, on the basis of the data representing weather forecasting and the outside-store illumination measured value sent from the controller 10 in the predetermined store 1.

The probability of precipitation for tomorrow is acquired from weather forecasting for tomorrow, and outside-store illumination, corresponding to several days in the past on which the probability of precipitation is the same as the probability of precipitation for tomorrow, are extracted, starting with the newest one from the database for illumination estimation. The averages of the extracted outside-store illumination, at the same time, corresponding to several days are respectively calculated. Consequently, an outside-store illumination estimated values for times during tomorrow is calculated, as indicated by A in FIG. 5.

Figures 4, 5:
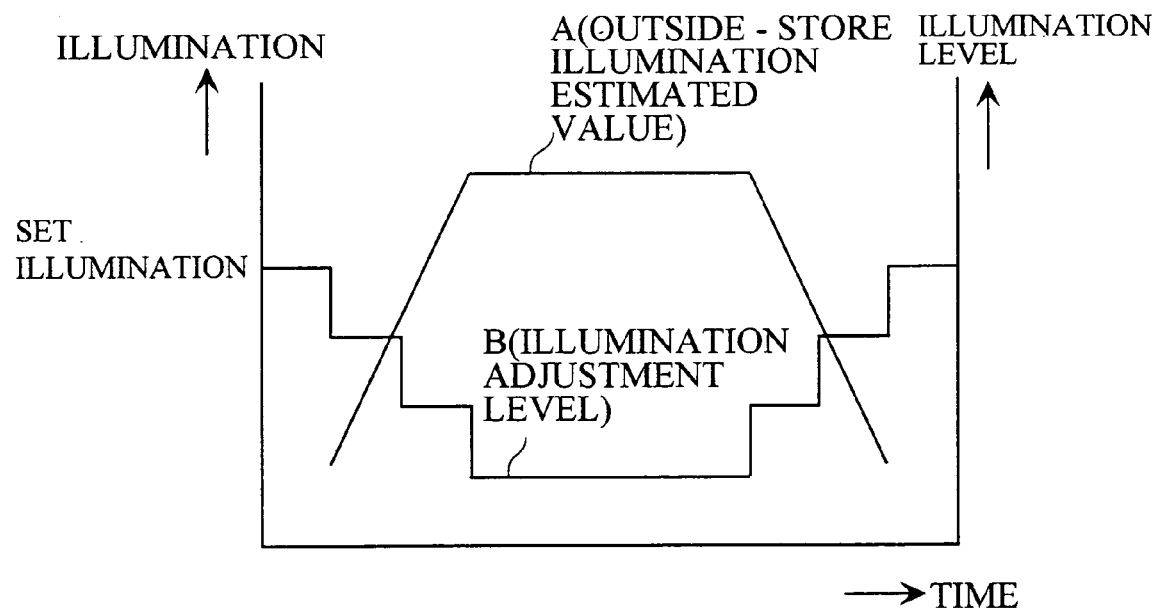
FIG. 4 is a schematic view showing a database for illumination estimation.
FIG. 5 is a graph showing the estimated value of an outside-store illumination levels and an inside-store illumination adjustment levels (a recommended illumination level for times during tomorrow)

An outside-store illumination adjustment level (a recommended illumination level) for each time of all tomorrow is then determined, as indicated by B in FIG. 5, on the basis of the outside-store illumination estimated value for each time of all tomorrow and the received set illumination. That is, four types of inside-store illumination adjustment levels (levels 1 to 4) are prepared using the set illumination as the best inside-store illumination adjustment level (level 4). The inside-store illumination adjustment level is determined such that the higher the outside-store illumination estimated value becomes, the lower the inside-store illumination adjustment level becomes.

Furthermore, an electricity rate corresponding to the difference in power consumption between a case where the illuminating equipment 32 is driven for a whole day such that the set illumination is obtained and a case where the illuminating equipment 32 is driven for a whole day such that the determined inside-store illumination adjustment level for each time is obtained is calculated.

The monitoring PC 20 transmits data such as the recommended illumination level corresponding to all tomorrow thus obtained to the controller 10 in the predetermined store 1 (step 14).

When the controller 10 receives the data such as the recommended illumination level from the monitoring PC 20 (step 4), it processes the data, and displays the processed data on a screen on the day of control (step 5). An example of the screen is illustrated in FIG. 6. The user operates the controller 10 with reference to displayed contents, to control the illuminating equipment 32.

[5] Description of Method of Producing Power Saving Advice Information Related to Air Conditioning Equipment 33

Figure 7:
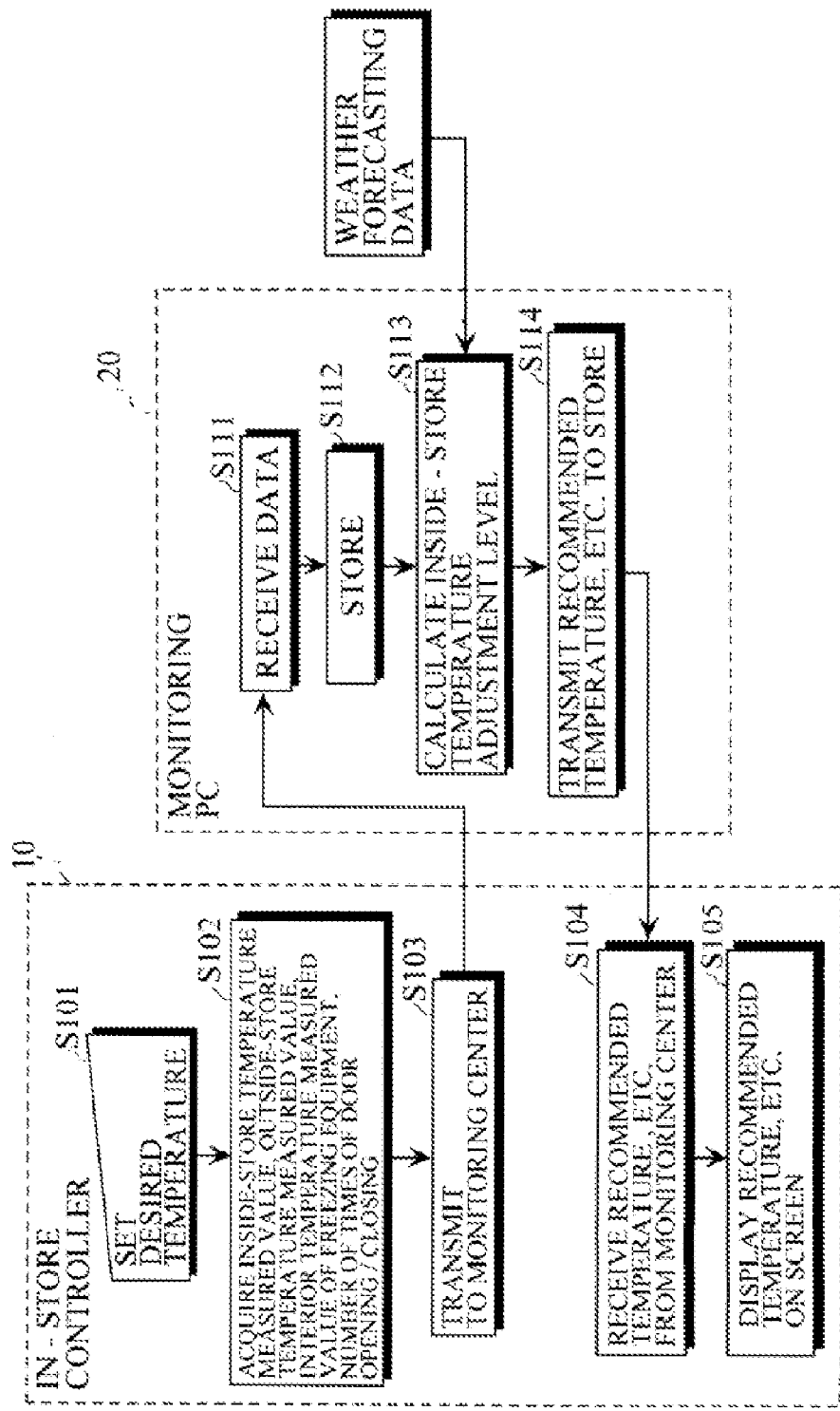
FIG. 7 is a flow chart for explaining a method of producing power saving advice information corresponding to air conditioning equipment 33.

Referring to FIG. 7, a method of producing power saving advice information related to the air conditioning equipment 33 will be specifically described. Here, description is made of a method of producing the power saving advice information related to the air conditioning equipment 33 in one predetermined store 1.

In the predetermined store 1, the user sets a desired temperature (a desired inside-store temperature) for the controller (in-store controller) 10 (step 101). The controller 10 acquires an inside-store temperature measured value, an outside-store temperature measured value, and an interior temperature measured value (a measured value of the interior temperature of the freezing showcase) from the inside-store temperature measuring device 45, the outside-store temperature measuring device 46, and the interior temperature measuring device 47, and acquires the number of times of opening/closing from the counter 49 (step 102). The controller 10 transmits the temperature set by the user, and the inside-store temperature measured value, the outside-store temperature measured value, the interior temperature measured value, and the number of times of door opening/closing which have been acquired to the monitoring PC 20 in the monitoring center 2 (step 103). Such processing is performed for each predetermined time period.

When the monitoring PC 20 in the monitoring center 2 stores the inside-store temperature measured value, the outside-store temperature measured value, the interior temperature measured value, and the number of times of door opening/closing from the controller 10 (step 11), it stores them in a storage device (step 112).

Processing for calculating the inside-store temperature adjustment level corresponding to all tomorrow on the basis of the inside-store temperature measured value, the outside-store temperature measured value, the interior temperature measured value, and the number of times of door opening/closing which have been so far received, and data representing weather forecasting (step 113).

The following describes the processing for calculating the inside-store temperature adjustment level. The monitoring PC 20 produces a database for temperature estimation storing the date, the time, the inside-store temperature measured value, the outside-store temperature measured value, the interior temperature measured value, the number of times of door opening/closing per unit time, and weather, as shown in FIG. 8, on the basis of the data representing weather forecasting and the inside-store temperature measured value sent from the controller 10 in the predetermined store 1. An interval Δt between times t is 10 minutes, for example.

An inside-store temperature estimated value (t+1) at time t+1 is defined by the following equation (1) using an inside-store temperature (t), an outside-store temperature (t), an interior temperature (t), and the number of times of door opening/closing (t) per unit time at time t, i.e., Δt t before the time t+1.

Inside-store temperature estimated value (t+1) at
time t+1=a×inside-store temperature(t)+b×outside-store temperature (t)+c×interior temperature (t)+d×the number of times of door opening/closing (t) per unit time     (1)

In the foregoing equation (1), a, b, c, and d are coefficients. Each of the coefficients a, b, c, and d is calculated by multiple regression analysis on the basis of data for one year in the past.

Weather for tomorrow is then acquired from weather forecasting for tomorrow, and data, corresponding to several days in the past on which weather is the same as the weather for tomorrow, are extracted, starting with the newest one, from the database for temperature estimation. The averages of the extracted data, at the same time, corresponding to several days are respectively calculated for the inside-store temperature measured value, the outside-store temperature measured value, the interior temperature measured value, and the number of times of door opening/closing per unit time. Consequently, data representing the inside-store temperature measured value (the average), the outside-store temperature measured value (the average), the interior temperature measured value (the average), and the number of times of door opening/closing per unit time (the average) are obtained for each time of one day, as shown in FIG. 9.

The obtained data for each time of one day (the inside-store temperature measured value (the average), the outside-store temperature measured value (the average), the interior temperature measured value (the average), and the number of times of door opening/closing per unit time (the average) are substituted in the foregoing equation (1), to calculate an inside-store temperature estimated value at the next time. Consequently, an inside-store temperature estimated value for each time of all tomorrow is obtained, as indicated by A in FIG. 10.

Figure 10:
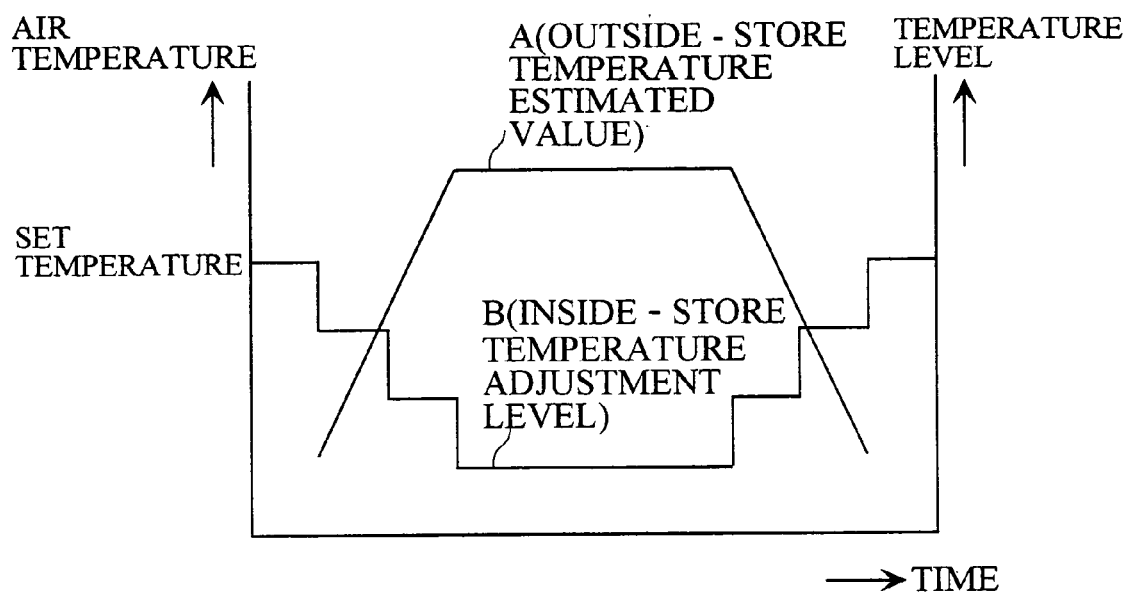
FIG. 10 is a graph showing an inside-store temperature estimated value and an inside-store temperature adjustment level (a recommended temperature level for times during tomorrow)

An inside-store temperature adjustment level (a recommended temperature level) for each time of all tomorrow is then determined, as indicated by B in FIG. 10, on the basis of the inside-store temperature estimated value for each time of all tomorrow and the received set temperature. That is, four types of inside-store temperature adjustment levels (levels 1 to 4) are prepared using the set temperature as the best inside-store temperature adjustment level (level 4). The inside-store temperature adjustment level is determined such that the higher the inside-store temperature estimated value becomes, the lower the inside-store temperature adjustment level becomes.

Furthermore, an electricity rate corresponding to the difference in power consumption between a case where the air conditioning equipment 33 is driven for a whole day such that the set temperature is obtained and a case where the air conditioning equipment 33 is driven for a whole day such that the determined inside-store temperature adjustment level for each time is obtained is calculated.

The monitoring PC 20 transmits data such as the recommended temperature level corresponding to all tomorrow thus obtained to the controller 10 in the predetermined store 1 (step 114).

Figure 11:
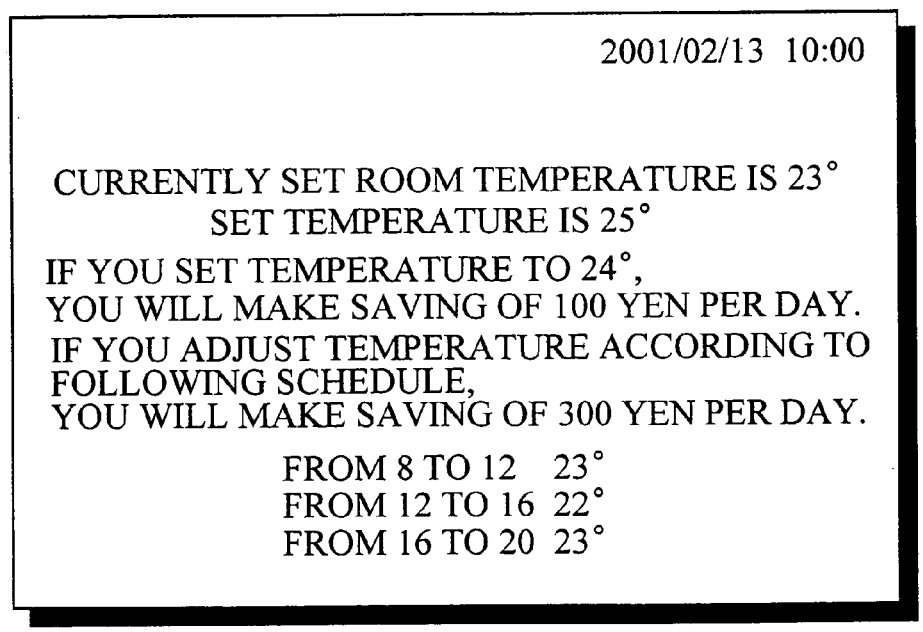
FIG. 11 is a schematic view showing an example of display of data received from a monitoring PC 20.

When the controller 10 receives the data such as the recommended temperature level from the monitoring PC 20 (step 104), it processes the data, and displays the processed data on a screen on the day of control (step 105). An example of the screen is illustrated in FIG. 11. The user operates the controller 10 with reference to displayed contents, to control the air conditioning equipment 33.

Although the inventions have been described and illustrated in detail, it is clearly understood that the same is by way of illustration and example only and is not to be taken by way of limitation, the spirit and scope of the inventions being limited only by the terms of the appended claims.

The invention claimed is:

1. A monitoring system for remotely monitoring in-store equipment comprising a controller provided in each store constructed and arranged to monitor and control in-store equipment and a monitoring computer connected to the controller in the store through a communication line, wherein the controller comprises data transmission means for transmitting to the monitoring computer data related to its respective in-store equipment and predetermined measurement data, and display means for displaying power saving advice information fed from the monitoring computer, and the monitoring computer comprises power saving advice information production means for producing power saving advice information for efficiently operating each in-store equipment on the basis of the data received from the controller, and power saving advice information transmission means for transmitting to the controller the produced power saving advice information and wherein when the in-store equipment is illuminating equipment, the data transmission means transmits data related to inside-store illumination set by a user and an outside-store illumination measured value from the controller to the monitoring computer, and the power saving advice information production means comprises means for calculating, on the basis of historical data related to the outside-store illumination measured values received from the controller, historical data related to weather forecasting, and weather forecasting for tomorrow, an outside-store illumination estimated values for times during tomorrow, and means for calculating, on the basis of the obtained outside-store illumination estimated values for times during tomorrow and the set inside-store illumination data received from the controller, recommended inside-store illumination values for times during tomorrow.

2. A monitoring system for remotely monitoring in-store equipment comprising a controller provided in each store constructed and arranged to monitor and control in-store equipment and a monitoring computer connected to the controller in the store through a communication line, wherein the controller comprises data transmission means for transmitting to the monitoring computer data related to its associated in-store equipment and predetermined measurement data, and display means for displaying power saving advice information fed from the monitoring computer, and the monitoring computer comprises power saving advice information production means for producing power saving advice information for efficiently operating each piece of in-store equipment on the basis of the data received from the controller, and power saving advice information transmission means for transmitting to the controller the produced power saving advice information and wherein when the in-store equipment is air conditioning equipment, the data transmission means transmits an inside-store temperature set by a user, an inside-store temperature measured value and an outside-store temperature measured value, and a measured value of a factor affecting the inside-store temperature by equipment other than the air conditioning equipment from the controller to the monitoring computer, and the power saving advice information production means comprises means for calculating, on the basis of historical data related to the inside-store temperature measured values, the outside-store temperature measured values, and the measured values of the factors affecting the inside-store temperature by the equipment other than the air conditioning equipment which are received from the controller, historical data related to weather forecasting, and weather forecasting for tomorrow, an inside-store temperature estimated value for each times occurring during tomorrow, and means for calculating, on the basis of the obtained inside-store temperature estimated values times during tomorrow and the set inside-store temperature received from the controller, inside-store temperature adjustment levels for times during tomorrow; wherein the measured value of the factor affecting the inside-store temperature by the equipment other than the air conditioning equipment is the measured value of the interior temperature of a piece of freezing equipment and/or the number of times a store door is opened or closed.

* * * * *